May 26, 1931. C. M. BAGSHAW 1,806,661
METHOD OF AND MEANS FOR PRODUCING SOLES OF OR FOR BOOTS AND SHOES
Original Filed Aug. 31, 1927 6 Sheets-Sheet 1
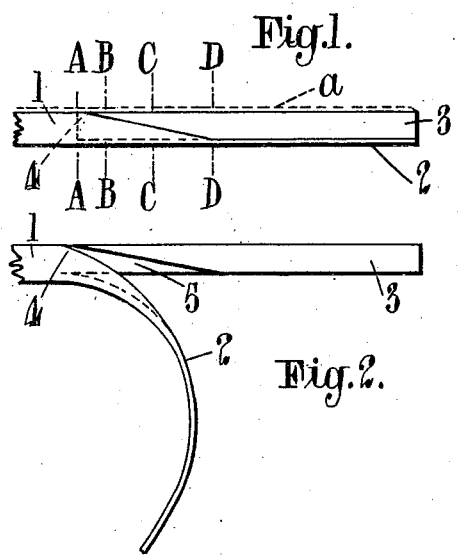
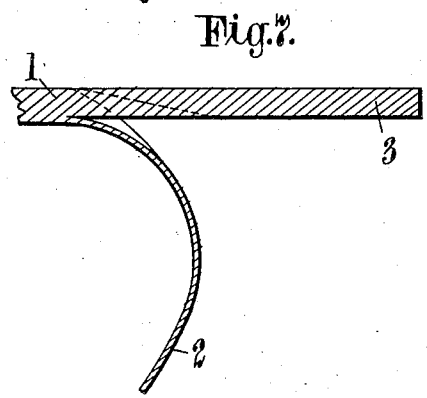
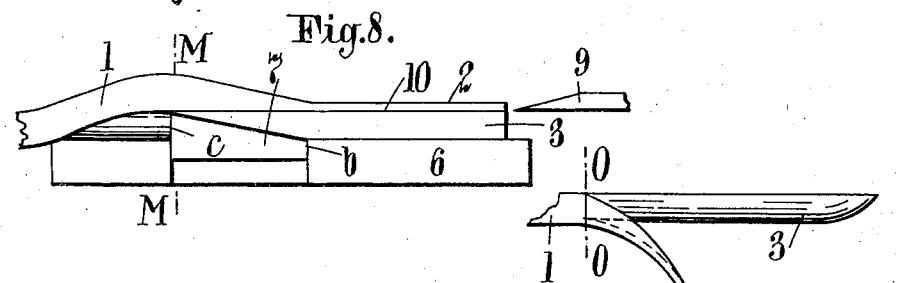
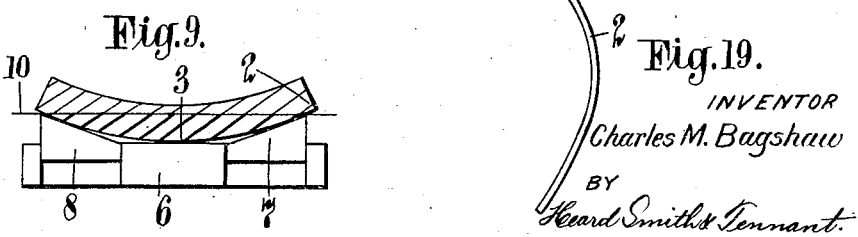
INVENTOR
Charles M. Bagshaw
BY
Heard Smith & Tennant
ATTORNEYS May 26, 1931. C. M. BAGSHAW 1,806,661
METHOD OF AND MEANS FOR PRODUCING SOLES OF OR FOR BOOTS AND SHOES
Original Filed Aug. 31, 1927 6 Sheets-Sheet 2
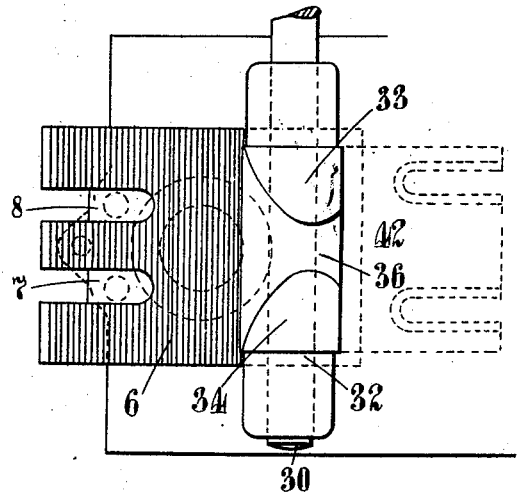
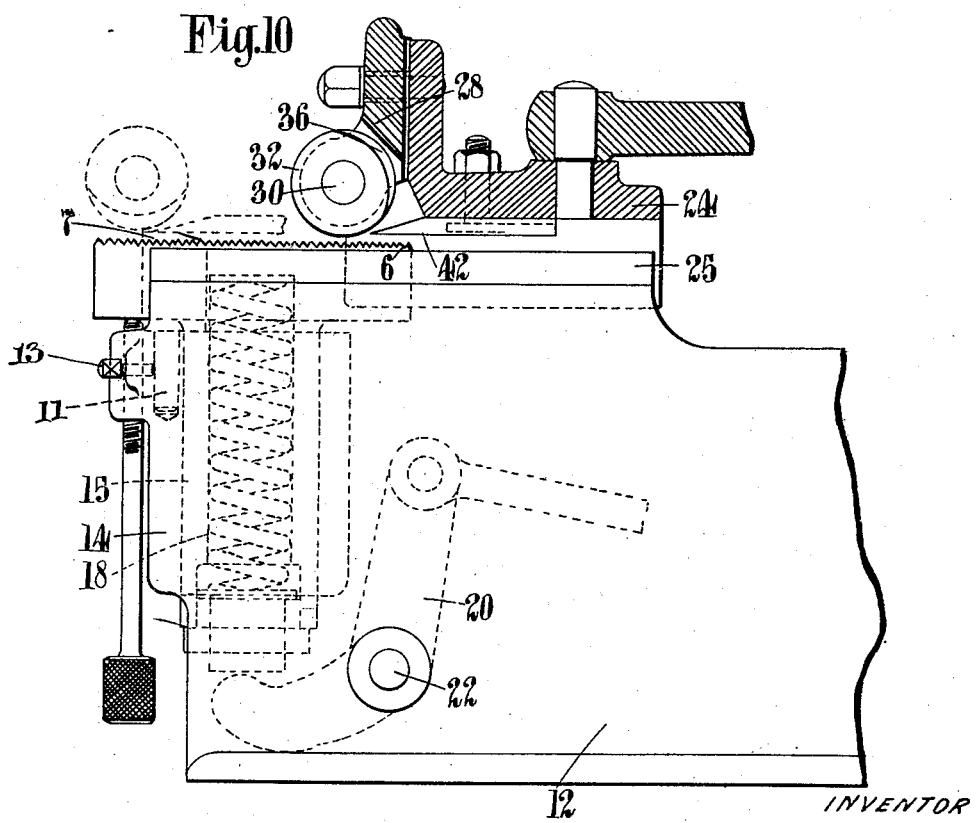
INVENTOR
Charles M. Bagshaw
BY
Heard Smith & Tennant.
ATTORNEYS May 26, 1931.  C. M. BAGSHAW  1,806,661
METHOD OF AND MEANS FOR PRODUCING SOLES OF OR FOR BOOTS AND SHOES
Original Filed Aug. 31, 1927   6 Sheets-Sheet 3

INVENTOR
Charles M. Bagshaw
BY
Heard Smith & Tennant.
ATTORNEYS

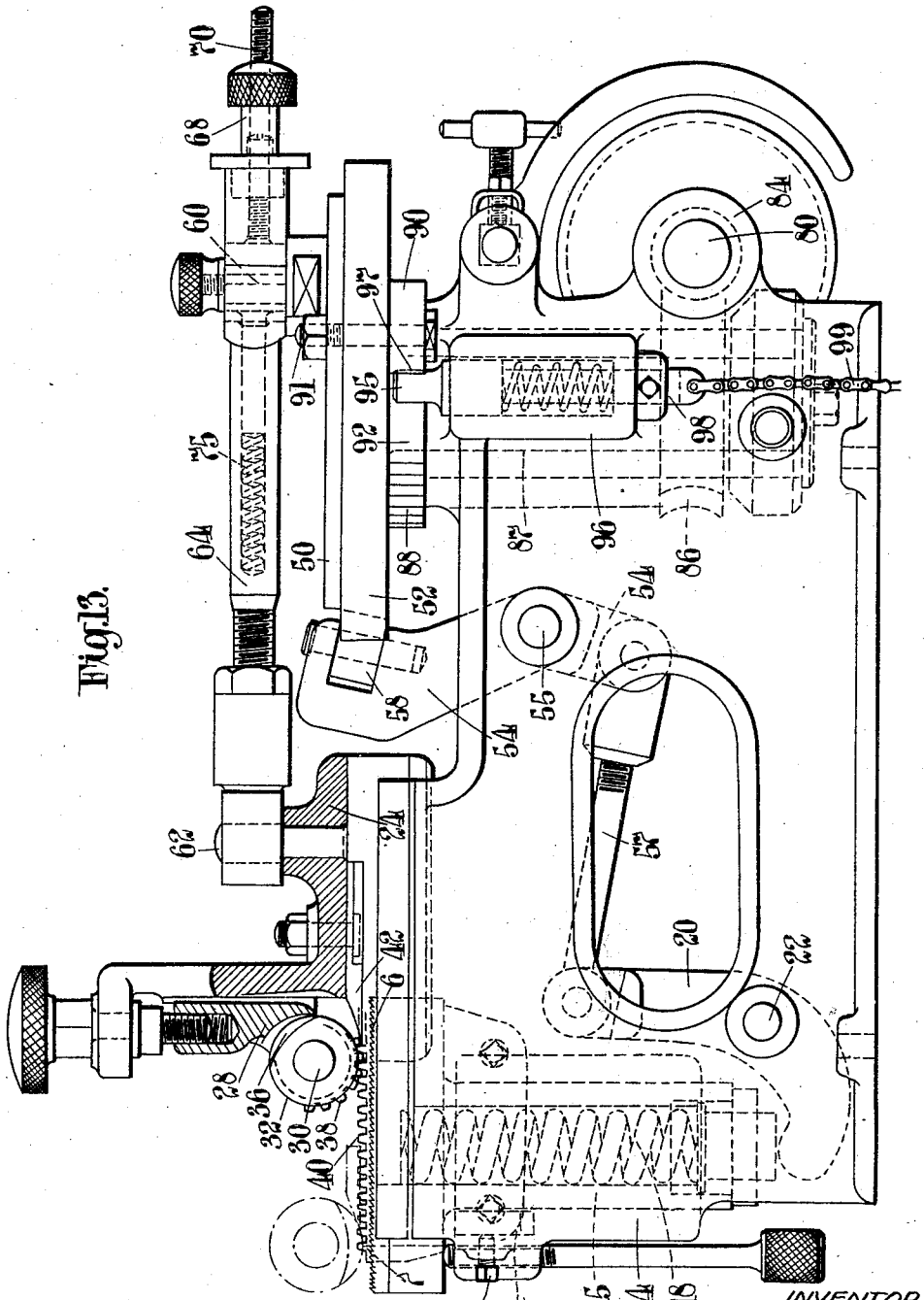

May 26, 1931. C. M. BAGSHAW 1,806,661
METHOD OF AND MEANS FOR PRODUCING SOLES OF OR FOR BOOTS AND SHOES
Original Filed Aug. 31, 1927 6 Sheets-Sheet 5

INVENTOR
Charles M. Bagshaw
BY
Heard Smith & Tennant.
ATTORNEYS

May 26, 1931.     C. M. BAGSHAW     1,806,661
METHOD OF AND MEANS FOR PRODUCING SOLES OF OR FOR BOOTS AND SHOES
Original Filed Aug. 31, 1927     6 Sheets-Sheet 6
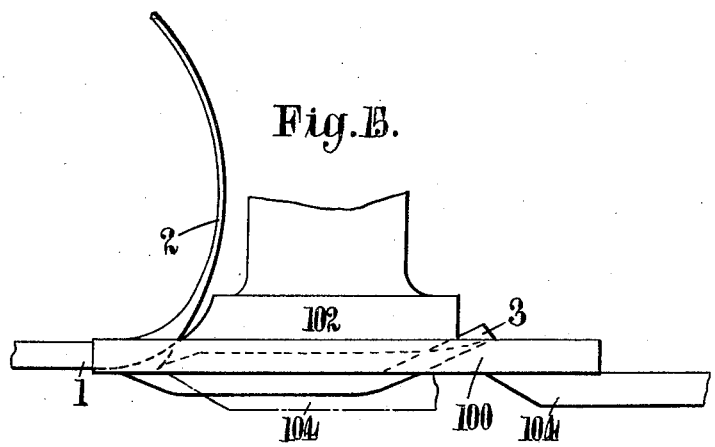
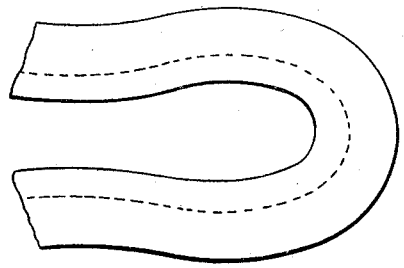
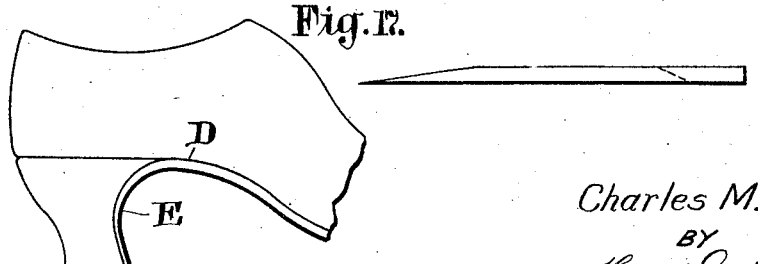
INVENTOR
Charles M. Bagshaw
BY
Heard Smith & Tennant.
ATTORNEY.

Patented May 26, 1931

1,806,661

UNITED STATES PATENT OFFICE

CHARLES MARTIN BAGSHAW, OF LEICESTER, ENGLAND, ASSIGNOR TO UNITED SHOE MACHINERY CORPORATION, OF PATERSON, NEW JERSEY, A CORPORATION OF NEW JERSEY

METHOD OF AND MEANS FOR PRODUCING SOLES OF OR FOR BOOTS AND SHOES

Original application filed August 31, 1927, Serial No. 216,708, and in Great Britain September 16, 1926. Divided and this application filed July 11, 1928. Serial No. 291,880.

This invention relates to improvements in methods and apparatus for use in the manufacture of soles for boots and shoes. Objects of the present invention are to provide a method and apparatus for making improved soles of the type disclosed in my copending application Serial No. 216,708, filed August 31, 1927, of whch the present application is a division.

In one aspect the invention provides an apparatus having a support for the heel end of a sole, means to deform said heel end, and a splitting knife arranged to move in a plane at an angle to the plane of the marginal portions of the sole at and adjacent to the heel breast line. In the illustrated apparatus the deforming means is constructed and arranged to deform the heel end portion of the shoe sole both transversely and longitudinally adjacent to the breast line, and the knife is arranged to split the full width of the thus deformed sole from the heel end to the breast line upon relative movement of the knife and deforming means longitudinally of the sole.

In the illustrated apparatus the deforming means comprises abutments, preferably adjustable, for supporting the portion of the sole to be deformed and rotary means which presses the sole upon the abutments and progressively deforms the sole as the action of the knife progresses. Preferably and as illustrated, the rear portion of the heel end of the sole is held flat against the support and is hence undeformed so that the knife splits from the rear part of the heel end portion of the sole a flap or apron of uniform thickness while the portion of the apron adjacent to the breast line is of progressively increasing thickness both longitudinally of the sole and laterally from its longitudinal median line toward its edge which, at the breast line, may be the full thickness of the sole. In the illustrated apparatus the abutments are inclined both longitudinally and transversely of the sole and the knife is moved relatively to the sole from its rear end forwardly, the rotary means comprising a roll shaped to press the sole into conformity with the abutments, the said roll being arranged for movement with the knife and having a rack and pinion connection with the support to cause the roll progressively to deform the sole as the splitting operation of the knife progresses.

Preferably the knife in its initial position forms a gage for positioning the sole lengthwise relatively to the apparatus, and the initial position of the knife may be adjusted for soles of different sizes. One form of the illustrated apparatus is organized for power operation both to press the abutments and roll together to move the knife longitudinally of the sole and to turn the roll.

In another aspect the invention comprises a method of forming aprons upon soles which consists in deforming the heel portion of a sole in a longitudinal direction with the extent of deformation increasing in a direction away from the heel end of the sole forwardly, and splitting the sole from the heel end forwardly preferably with the line of the split located entirely within the body of the sole so that the apron produced will have side margins that progressively increase in thickness toward the junction of the apron with the sole. In the illustrated method the portion of the heel end of the sole adjacent to the breast line is deformed both in a lateral and a transverse direction, the rear portion of the heel end being left undeformed so that the portion of the apron adjacent to the breast line decreases in thickness from its opposite edges toward the longitudinal median line of the sole.

These and other features and aspects of the invention will appear more fully from the following detailed description when read in connection with the accompanying drawings and will be pointed out in the appended claims.

In the drawings,

Fig. 1 is a side elevation of the rear portion of a sole after having been operated upon in accordance with the present invention;

Fig. 2 is a view similar to Fig. 1 with the apron bent down into the position approximately which it will occupy when laid against the breast face of a Louis heel;

Figs. 3, 4, 5 and 6 are transverse sectional views of Fig. 1 taken on the lines A—A, B—B, C—C, and D—D, respectively;

Fig. 6a is a view similar to Fig. 5 showing a modification;

Fig. 7 is a longitudinal central section of the sole as shown in Fig. 2;

Figs. 8 and 9 are, respectively, a side elevation and an end elevation, partly in section, of apparatus whereby the preferred method of forming my improved apron on the heel end of the sole may be performed;

Fig. 10 is a side elevation, partly in section, of manually operable apparatus for use in producing my improved apron;

Fig. 11 is a plan view of Fig. 10;

Fig. 13 is a side elevation, partly in section, of a power-operated apparatus for a similar use;

Fig. 15 illustrates the apparatus for cutting the heel-seat;

Figs. 16 and 17 are, respectively, a plan and a side view of the material removed from the heel-seat portion of the sole;

Fig. 18 is a transverse section on the line O—O of Fig. 19;

Fig. 19 is a side elevation of the rear portion of the sole after the heel-seat portion has been cut; and Fig. 20 is a view of a shoe the sole of which is provided with an apron formed in accordance with the present invention.

Figure 12:
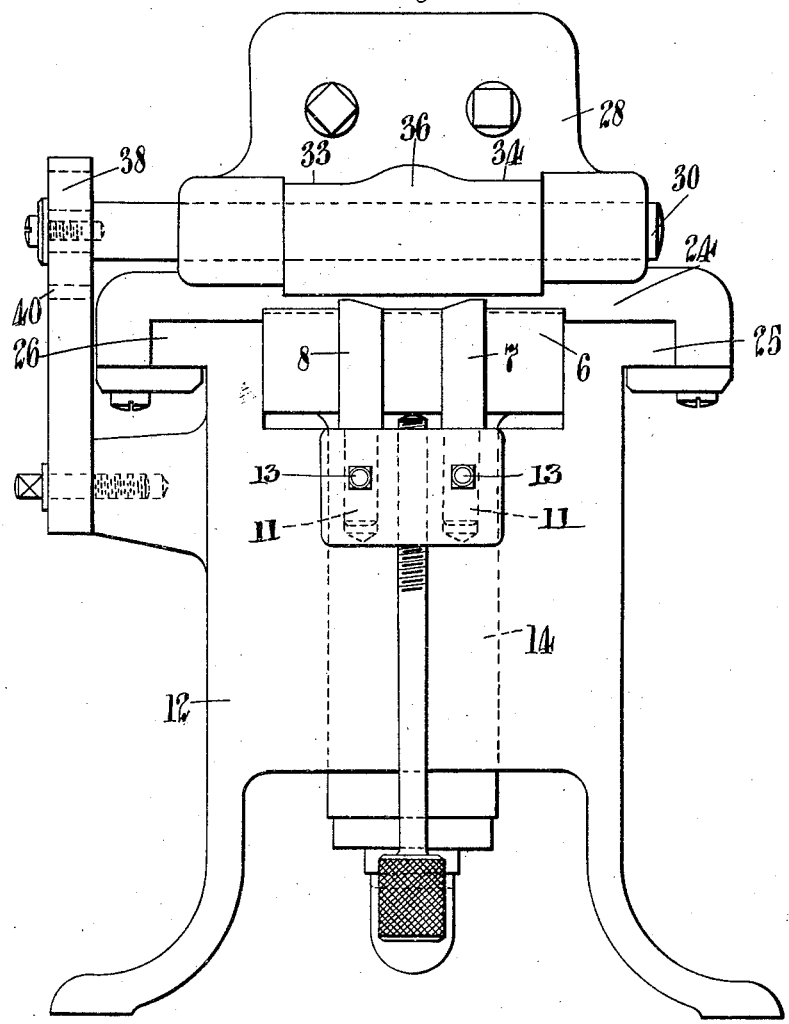
Fig. 12 is an end elevation of Fig. 10.

In the first instance it will be convenient to describe the sole to be made in accordance with the method of and by the apparatus illustrated as embodying the present invention.

Fig. 1 shows the heel end of a shoe sole 1 which is slit or split for a desired distance from the end forwardly—say as far as the line D—D—so as to form a thin flap 2 (on the grain side) of substantially uniform thickness and a heel seat flap 3. From the line D—D forwardly to the line A—A (which is at or adjacent to the heel breast line) the splitting operation is continued in such a manner that the flap or apron at this part—except at or immediately adjacent to the longitudinal centre or median line—is of gradually increasing thickness, the increase in the thickness being greater at the side edges of the sole than at the parts adjacent thereto.

From Figs. 3, 4, 5 and 6 it will be seen that whereas the stem portion of the flap or apron at or adjacent to the longitudinal central line thereof has a thickness no greater than that of the end part of the flap, it more or less gradually increases in thickness towards the opposite side edges. As can be seen this gradual increase in the thickness is greater on the section B—B (Fig. 4) than on the section C—C (Fig. 5) and is greatest on the section A—A (Fig. 3).

The stem portion of the sole, therefore, that is to say the part which in the illustrated example is located between the lines D—D and A—A, except at the centre line longitudinally thereof, is of gradually increasing thickness from the line D to the line A, and of gradually diminishing thickness from the opposite side edges towards the longitudinal centre line thereof.

It is a common practice in some shoe factories to chamfer off the opposite side margins of the sole at the waist so as to impart a light and neat appearance to the finished shoe. This chamfering off is indicated in Figs. 1 and 3 in which the full thickness of the sole is indicated by the broken line a. Whatever be the thickness of the opposite side edges of the sole I preferably make the apron so that at its root 4 its opposite side edges are of the thickness of the side edges of the sole.

I now propose to describe my improved method whereby the above described apron may be produced and apparatus for use in carrying out said method whereby the apron may be formed by a single skiving cut so that the aprons can be produced very expeditiously.

Stated briefly, the method consists in deforming that part of the sole from which the portion of varying thickness of the improved apron is to be cut in the direction lengthwise and also in the direction widthwise of the sole, and incising or splitting the sole from the heel end forwardly to about the limit of the deformation. The part on or immediately adjacent to the longitudinal central line of the deformed portion of the sole and the portion of the heel end of the sole rearwardly of the deformed portion will usually be maintained in a single plane so that this will be of even thickness throughout, and the line of split will be located entirely within the body of the sole, although I do not limit the scope of the present invention to this. This method of producing my improved apron will now be described with reference to the apparatus shown in Figs. 8 and 9.

In Fig. 8 the numeral 6 indicates a horizontal table which is provided with two ridges or abutments 7, 8, that are spaced a suitable distance apart. The upper face of each abutment is inclined in the longitudinal direction, the abutment projecting above the surface of the table a zero distance at one end b, and a desired maximum distance (which may be a distance about equal to the thickness of the sole at its side edges at the breast line) at the other end c, about as shown in Fig. 8. The said upper faces are preferably also inclined in the transverse direction about as shown in Fig. 9. The heel end of the shoe sole is laid on the table 6 in such a position that the heel breast line or thereabout of the sole is over the front edges of the two abutments 7, 8. Means is provided whereby the sole is pressed down between the abutments 7, 8, against the table and whilst the sole is thus deformed in the longitudinal and also in the transverse directions, a skiving knife 9, which is arranged to move in a plane parallel to the upper face of the table 6, is made to advance so as to split the sole from the extreme end to about the front edges of the parts 7, 8, the cut being indicated by the numberal 10. By his method of operating, the apron is produced by a single cut of a skiving knife. The shape of the apron as regards its inner face and the length of the deformed part of the sole may of course be varied as may be found desirable by merely varying the degree of the deformation in one or both directions as aforesaid.

Simple manually operated means for carrying out the said method is illustrated in greater detail in Figs. 10 to 12.

A suitable frame 12 is provided with a vertical bearing 14 to support the hollow spindle 15 of a horizontal table 6 which latter is adapted to be moved up or down. Projecting through slots in the table are abutments 7, 8, which are located a suitable distance apart and have their upper faces inclined as already described. Said abutments are provided with downwardly extending stems or shanks 11 that are received in apertures in the machine frame wherein they are held by set screws 13. By slacking back the screws 13 the abutments 7, 8, may be adjusted vertically—usually so that the skiving knife to be referred to just contacts with the upper surfaces of the abutments during its operation. The table—which preferably has its upper surface serrated—is normally maintained in its lowermost position by a spring 18, an elbow lever 20, pivotally supported at 22, being provided by the operation of which the table may be raised.

Supported by a slide member 24, which is arranged for reciprocating movement on horizontal bearings 25, 26, on the frame 12 is a bearing block 28 which carries a horizontal shaft 30, that has fixed to it a roller 32 which has parts 33, 34, cut away so as to leave projecting a central hump 36. One end of the shaft has secured to it a toothed pinion 38 that meshes with a toothed rack 40 on the frame 12 of the machine, and secured to the slide member is a skiving knife 42.

Figure 12A:
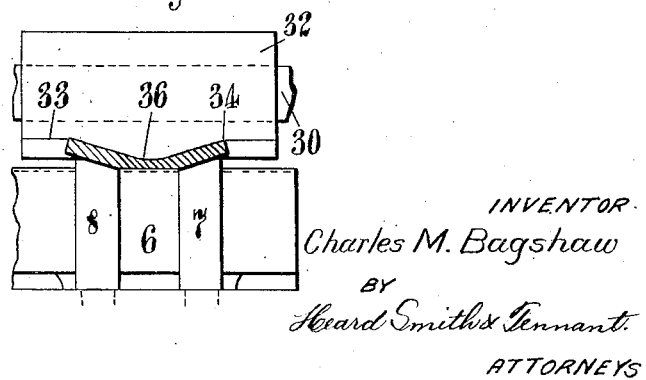
Fig. 12a is a detailed view similar to Fig. 12 showing a sole in section.

The construction and arrangement of the parts described are such that the operator, having correctly positioned the sole on the table 6 and abutments 7, 8, as described, actuates or brings about the actuation of the elbow lever 20, to raise the table 6 to cause the end of the sole to be pressed firmly against the roller 32. He then by suitable means, moves or brings about the movement of the slide member 24 forwardly whereupon the roller 32 and skiving knife 42 will advance, the roller 32 firmly pressing the sole against the table 6 whilst the skiving knife 42 splits the rear end of the sole 1 to form on it a thin part of the apron 2. When the roller and knife reach the abutments 7, 8, by which the part of the sole in contact therewith is raised above the surface of the table, the hump 36 on the roller will press the part of the sole between the abutments 7, 8, down against the table 6, as shown in Fig. 12a, this part of the sole being thus deformed in both the longitudinal and transverse directions the knife 42 cutting progressively deeper into the sole and to a greater depth at the opposite side edges than at the parts adjacent thereto until, when the knife reaches the front edges of the abutments, it will—according to adjustments made—cut completely through the opposite side edges of the sole. When the parts are returned to normal position and the sole is removed it will have an apron of the form already described.

Suitable stops or gauges may be provided to assist the operator when positioning the sole on the table, but we find in practice that the simplest way in which to determine the position of the sole longitudinally of the abutments, is to adjust the position of the skiving knife 42 so that when the machine is at rest with the knife at its most rearward position and with the table lowered, the operator simply pushes the heel end of the sole under the roller 32 and against the edge of the knife 42. For obtaining the correct positioning of the sole in the lateral direction he may simply utilize the abutments 7 and 8 as guides.

Figure 14:
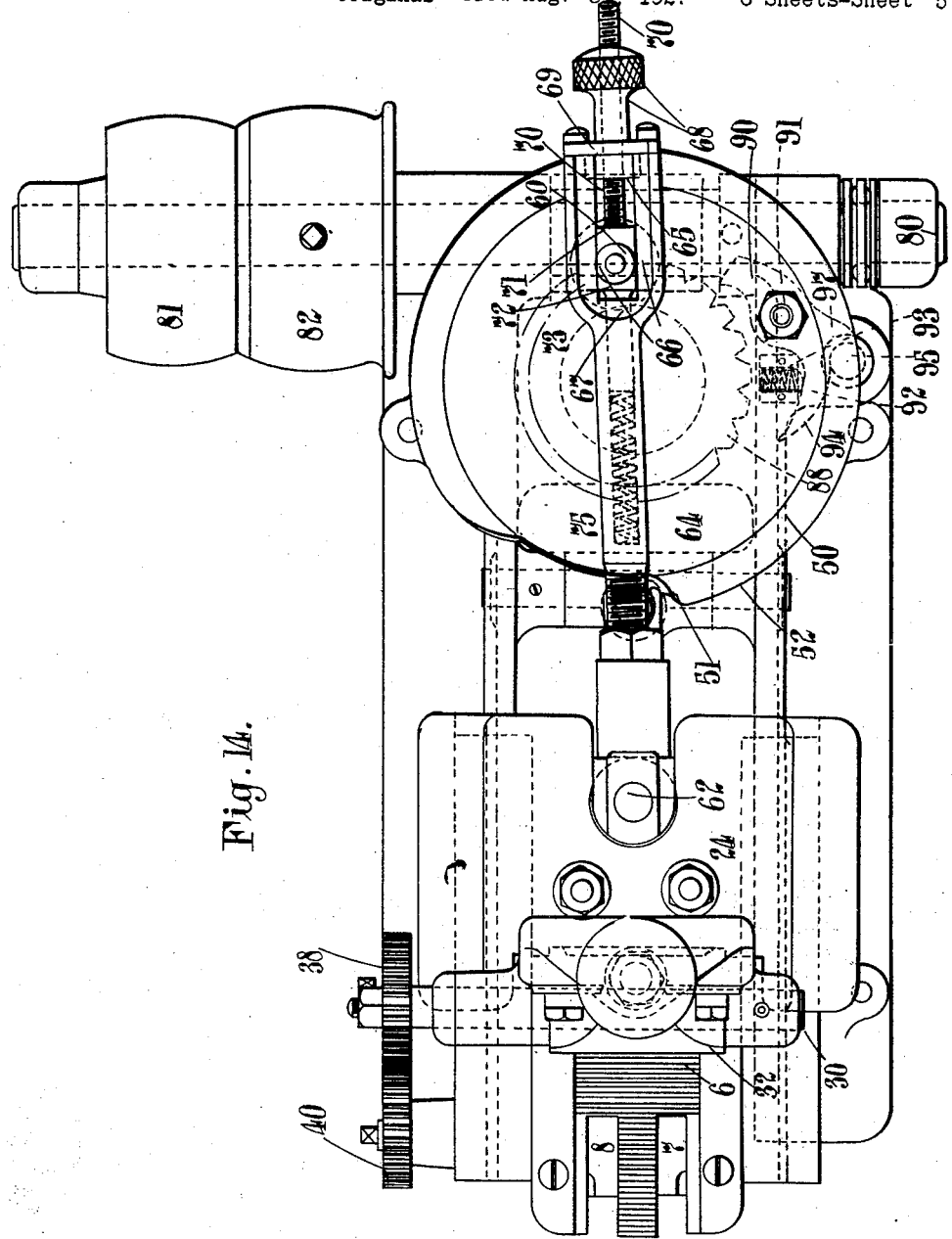
Fig. 14 is a plan view of Fig. 13.

Figs. 13 and 14 show, by way of example, means for operating the parts by power. For this purpose I propose to provide a horizontal rotary disc 50 the peripheral face 52 of which is formed as a cam which operates a rocking lever 54 on a stud 55 said rocking lever being connected by a preferably adjustable link 57 to the elbow lever 20 and having a cam roll 58 engaging the cam 52. The disc 50 is also provided with a stud or crank-pin 60 that is connected to a stud 62 on the slide member 24 by a connecting link.

The connecting link is preferably adjustable, this being attained as follows: The stem or main part 64 of the link is pivotally connected to the stud 62, and its rear end is bifurcated and carries a slide bearing 66 and an end-plate 69, which has an aperture in which a rotatable internally screw-threaded sleeve 68 is supported, the sleeve having a part 65 of larger diameter that engages against the inner face of the plate 69 and the rear end of the sleeve having a knurled head whereby the sleeve may be rotated. Engaged in said screw-threaded sleeve is a screw-threaded spindle 70 the forward end of which is provided with a bearing block 71 to be engaged against the rear part of the crank pin or stud 60. Engaged against the front part of the stud 60 is provided a bearing block 72 which has a stem 73 that is entered in a recess in the part 64 of the link, a spring 75 pressing against the stem thereby maintaining the block 72 against the stud. By rotating the sleeve 68 in one or the other direction, the link 64 may be adjusted forwardly or backwardly so as to determine the position of the part 24 and consequently of the knife 42 and roller 32 nearer to or further from the abutments 7, 8, so that the operator may, when using the edge of the knife 42 as a gauge, determine the distance, from the extreme end of the sole, at which the deformation as described, of the sole shall be effected.

In the position shown, the block 72 is some distance from the forward end 67 of the slide bearing 66 so that when the disc 50 is rotated the stud 60, during the first part of said rotary movement, will merely move said bearing block 72 until it contacts with the end 67 of the slide bearing 66 (the spring 75 not being strong enough to cause the knife 42 to cut into the sole) and only then will said stud impart movement to the main stem 64 and through this to the slide member 23, roll 32, and knife 42. By rotating the nut 68 in one direction, the bearing block 72 may be made to be in contact with the end 67 of the slide bearing 66 in which event the crank-pin 60 will impart the maximum movement to the slide member 24 but whatever the adjustment may be, the skiving knife and its work pressing and deforming roller will move to the same position, i. e., to the forward end of the blocks or abutments 7, 8.

For rotating the disc 15 we provide a horizontal shaft 80 which has mounted on it the usual loose and fast pulleys 81, 82, and on which shaft we secure a worm 84 that is in mesh with a worm-wheel 86 on a vertical shaft 87, on the upper end of which is fixed a toothed wheel 88 so that the latter is in constant rotation.

Mounted to rock on a stud 91 on the disc 50 is a pawl 90 against the curved tail end 92 of which a spring 93 presses tending to cause the pawl to engage with the rotating toothed wheel 88 and thus couple the cam disc 50 to said wheel. The pawl is however, normally held out of engagement with said wheel by a vertical stud 95, which is supported for vertical movement in a bearing 96, a spring serving normally to maintain the stud in the raised position.

The stem 98 of the stud is connected by a chain 99 to a treadle or other lever the arrangement of the parts described being such that when the operator—having previously placed the heel end of a shoe sole in position under the roller 32 and against the skiving knife 42—momentarily depresses the stud 95 to disengage this from the pawl 90, the spring 93 will at once cause the pawl to engage with the rotating toothed wheel 88 this latter thereby rotating the cam disc 50, so that the cam face 52 thereon, acting through the parts 54, 57 and 20 will press the table upwards and cause the work to be firmly held against the table by said roll. This movement is brought about by the part 51 of the cam 52 so that the work is gripped between the roller 32 and the table 6 almost simultaneously with the starting of the rotational movement of the disc 50.

The cam disc continuing to rotate, the crank-pin 60 will impart movement to the slide-member 24 and the roller 32 and knife 42 carried by this, and the roller 32 will be rotated by its connection by the pinion 38 with the rack 40.

During the forward movement of the carrier 24, when the roller and knife reach the abutments 7, 8, the hump 36 on the roller and the two abutments 7, 8, will serve as cooperating sole-deforming elements which will deform a part of the sole in both the longitudinal and the transverse directions and which elements are in operation when the knife 42 is splitting said part of the sole and by which the stem portion of my improved apron is produced as already described.

When the disc 50 has nearly completed a revolution the curved tail 92 of the pawl 90, will engage against the stud 95 so that the inclined or cam shaped outer face 94 of said tail will cause the pawl 90 to be rocked about the supporting pivot 91 and become disengaged from the toothed wheel 88, the pawl having a hooked-shaped part 97 which engages against the stud 95 and brings the disc to stop with the knife 42 and related parts in the most rearward position.

The apron having thus been cut it only remains to cut away the marginal portion of the heel-seat part 3 of the sole so as to produce the substantially convex tongue for the reception of the heel.

This I effect in the known manner in a separate machine illustrated in Fig. 15, viz., by placing the part 3 of the sole on a form plate 100 having an opening therein of suitable shape and bulging its central part by a plunger 102 through the opening in said plate and whilst the sole is deformed, advancing a skiving knife 104 which is arranged for movement along the lower face of the form plate.

In view of the fact that the part 3 of the sole is tapered off on the opposite side margins at the part 5 (Fig. 2) when the apron is formed in accordance with this invention, it is only necessary to advance the skiving knife 104 from the position shown in full lines (Fig. 15) to that shown in broken lines, when the marginal portion of the part 3 of the sole will be completely severed from the sole.

The part thus severed by a single cut is shown in plan view in Fig. 16 and in side elevation in Fig. 17. Fig. 18 is a sectional view similar to Fig. 3 but with the marginal portion of the seat-portion 3 cut away as described, and Fig. 19 is a side elevational view of the shoe sole with the apron bent down. Fig. 20 is a view showing my improved apron applied to the heel breast, from which it will be seen that the apron is homogeneous and gradually decreases in thickness from its root or junction at D with the waist part of the sole to about the part E, thereby producing a very neat appearance and, further, adding considerably to the strength of the shoe at the part where the waist joins the heel portion.

The improved apron described has a smooth and concave inner face that fits snugly against the convex face of the upper part of Louis heels and owing to the absence of separate tabs the sole and consequently the shoe is appreciably stronger at the critical part, viz., at the junction of the waist with the heel portion than when shoe soles having aprons and loose tabs are employed.

Further, by the method of producing the improved apron as hereinbefore described, the heel end of the sole can be prepared completely for the reception of Louis heels by two cuts, by one of which the improved form of apron is formed and by the other of which the unwanted marginal portion of the heel seat part of the sole is trimmed and completely detached.

In the foregoing description the means whereby the shoe sole is deformed simultaneously both in the longitudinal and transverse directions and split whilst so deformed to produce the improved apron, include a flat table and skiving knife, this being in my view the most simple form of said means.

Further, if desired several sets of co-operating sole-deforming means of the character and for the purpose described may be provided with each machine.

Also I should state that I find the most convenient procedure in producing the shoe sole for reception of Louis heels is to produce the improved apron on the heel end of a shoe sole prior to its attachment permanently to the shoe and to produce the finished heel-seat subsequent to the attachment of the sole by sewing or otherwise at the forepart and at the waist to the shoe, although the scope of this invention is not limited to such procedure.

Further, I wish it to be understood that I do not limit the scope of this invention to the production of a shoe sole the apron of which gradually and substantially uniformly varies in thickness as illustrated by way of example in the drawings. For some special reason, for instance if heels of exceptional shape are to be employed, or if the finished shoe is to have a distinctive appearance at the heel breast region, it may be desirable to impart to the apron a shape differing from that illustrated. To obtain such a result it is only necessary to alter the shape of the co-operating sole-deforming means.

What I claim is:—

1. An apparatus for producing an apron on a shoe sole comprising a support for the heel end of the sole, means to deform said heel end, and an apron splitting knife arranged to move in a plane at an angle to the plane of the marginal portions of the sole at and adjacent to the heel breast line.

2. An apparatus for producing an apron on a shoe sole comprising means to support the sole, a deforming roller arranged for movement from the extreme heel end of the sole toewards and co-operating with said supporting means to maintain the full width of a portion of the sole in undeformed condition during the first part of its movement, and then to deform the sole to a progressively increasing extent, and a skiving knife arranged to split into the full width of the sole from the extreme heel end to the heel breast line.

3. An apparatus for producing an apron on a shoe sole comprising means to support the sole, a deforming roller arranged for movement from the extreme heel end of the sole toewards and co-operating with said supporting means to maintain the whole of the longitudinal central portion of the sole in undeformed condition, but to deform the marginal portions of the sole at and adjacent to the heel breast line to a progressively increasing extent, and a skiving knife arranged to split into the full width of the sole from the extreme heel end to the heel breast line.

4. An apparatus for producing an apron on a shoe sole comprising a splitting knife, means co-operating to maintain the longitudinal central portion of the sole undeformed and in the plane of said knife and to deform the sole so that each side marginal portion at and for some distance heelwards of the heel breast line is in a plane at an angle to the plane of the knife, and means to support and operate the knife to split into the full width of the deformed sole from the extreme heel end to the heel breast line.

5. A apparatus for producing an apron on a shoe sole comprising a splitting knife, means cooperating to maintain the longitudinal central portion of the sole undeformed and in the plane of said knife and to deform the sole so that each side marginal portion at and for some distance rearwardly of the heel breast line is in a plane at an angle to the plane of the knife, means to support and operate the knife to split into the full width of the deformed sole from the extreme heel end to the heel breast line, and means to maintain the portion of the sole from the extreme heel end thereof forwardly in undeformed condition so that the part of the apron split from that portion is of uniform thickness.

6. An apparatus for producing an apron on a shoe sole comprising a support for the sole, a sole presser, means whereby relative movement may be imparted to the support and sole on the one hand and presser on the other, means that co-operate with the presser to deform the sole transversely thereof and longitudinally thereof at the marginal portions to a uniformly increasing extent adjacent to the heel breast line, and a splitting knife arranged to split into the full width of the deformed sole from the extreme heel end to the heel breast line.

7. An apparatus for producing an apron on a shoe sole comprising a support for the sole, a sole presser, means whereby relative movement may be imparted to the support and sole on the one hand and the presser on the other, means that co-operate with the presser to deform the sole transversely thereof to a uniformly increasing extent adjacent to the heel breast line, and a splitting knife arranged to split into the full width of the deformed sole from the extreme heel end to the heel breast line.

8. An apparatus for producing an apron on a shoe sole comprising means to support the sole, a splitting knife, and an abutment on each side of the sole to engage it at and adjacent to the heel breast line, the sole engaging surface of which is inclined in both the transverse and longitudinal directions with respect to the plane of the knife.

9. An apparatus for producing an apron on a shoe sole comprising a flat table to support the heel end of the sole, a pair of abutments to engage one each side of the sole at and adjacent to the heel breast line, a roller having a plain peripheral portion and a hump or cam deforming peripheral portion, means to move said roller so that its plain portion presses the full width of the sole at and adjacent to the extreme heel end thereof flat against the table in undeformed condition, and thereafter the deforming portion presses the central portion of the sole between the abutments and against the table, and a skiving knife arranged to split into the full width of the sole from the extreme heel end to the heel breast line.

10. An apparatus for producing an apron comprising means to deform the heel end of a shoe sole in both the transverse and longitudinal directions at and adjacent to the heel breast line, and a skiving knife arranged to split into the full width of the deformed sole from the extreme heel end to the heel breast line.

11. An apparatus for producing on a shoe sole an apron, comprising co-operating means consisting of abutments spaced a desired distance apart on which the part of the sole to be deformed is received and a roller-presser relatively positioned and actuated so that the sole is progressively deformed simultaneously in both the longitudinal and transverse directions, a splitting knife, and means to effect relative movement between the knife and the sole.

12. An apparatus for producing on a shoe sole an apron comprising cooperating means consisting of abutments spaced a desired distance apart on which the part of the sole to be deformed is received and a roller presser relatively positioned and actuated so that the sole is progressively deformed simultaneously in both the longitudinal and transverse directions, a splitting knife arranged to determine the position of the sole longitudinally in relation to the sole deforming means, and means to effect relative movement between the knife and the sole.

13. Apparatus for use in forming a shoe sole with an apron having the opposite side margins progressively increasing in thickness towards the root or juncture of the said apron with the sole, comprising in combination a support for the sole, a splitting knife, means for maintaining the said sole in determined position upon said support with reference to said splitting knife, means co-operating to deform both in the longitudinal and transverse directions a part of the sole extending from the root or juncture of the said apron with the sole to a determined portion intermediate the said root or juncture and the rear end of the sole, in such manner as to produce an apron having its inner heel-breast contacting face concave adjacent the said root or juncture, and means for imparting relative movement to the said support and to the said knife to effect the sole splitting operation.

14. Apparatus for use in forming a shoe sole with an apron having the side margins progressively increasing in thickness towards the root or juncture of the said apron with the sole, comprising in combination a support upon which the sole engages frictionally, a splitting knife, means comprising a roller for pressing the sole into frictional engagement with the said support during the sole splitting operation, abutments mounted in determined positions with reference to the said support, a projecting part upon the said roller for co-operating with the said abutments to deform a part of the sole both in the longitudinal and transverse directions, means for imparting relative movement to the said support and the said roller and splitting knife, and means comprising a rack and pinion for causing the said projecting part upon the said roller to co-operate with the said abutments during the said relative movement.

15. Apparatus for use in forming a shoe sole with an apron having the opposite side margins progressively increasing in thickness towards the root or juncture of the said apron with the sole, comprising in combination a vertically moveable support upon which the sole engages frictionally, a splitting knife, means comprising a roller moveable transversely above and relative to the said support and against which the sole is pressed during the sole splitting operation on raising the said vertically moveable support, abutments mounted in determined positions with reference to said support, a projecting part upon the said roller for co-operating with the said abutments to deform a part of the sole both in the longitudinal and transverse directions, means for imparting relative movement to the said support and to the said roller and splitting knife, and means comprising a rack and pinion for causing the said projecting part upon the said roller to co-operate with the said abutments during the said relative movement.

16. Apparatus for use in forming a shoe sole for the reception of Louis heels, comprising in combination a support for the sole, a splitting knife, means for maintaining the said sole in determined position upon the said support with reference to the said splitting knife, vertically adjustable abutments mounted in determined position with reference to the said support, means co-operating with the said abutments to deform longitudinally a part of the sole, and means for imparting relative movement to the said support and to the said knife to effect the sole splitting operation, the parts being so constructed and arranged that on said part of the sole an apron is formed the opposite margins of which progressively increase in thickness towards the root or juncture of said apron with the sole.

17. Apparatus for use in forming a shoe sole for the reception of Louis heels, comprising in combination a support for the sole, a splitting knife, means for maintaining the said sole in determining position upon the said support with reference to the said splitting knife, vertically adjustable abutments mounted in determined position with reference to the said support, means co-operating with the said abutments to deform a part of the sole transversely and means for imparting relative movement to the said support and to the said knife to effect the sole splitting operation, the parts being so constructed and arranged that said operation forms on said part of the sole an apron of gradually decreasing thickness from its opposite side edges towards the longitudinal median line of the sole.

18. Apparatus for use in forming a shoe sole with an apron having the opposite side margins progressively increasing in thickness towards the root or juncture of the said apron with the sole, comprising in combination a support for the sole, a splitting knife, means for maintaining the said sole in determined position upon the said support with reference to the said splitting knife, means co-operating to deform a part of the sole both in the longitudinal and transverse directions, a reciprocatable carriage carrying the said knife, a rotatable element carrying a crank pin, and adjustable means comprising a lost motion device connecting the said crank pin and the said reciprocable carriage whereby movement of determined extent may be imparted to the said carriage to effect the splitting operation on rotation of the said rotatable element, substantially as described.

19. Apparatus for use in forming a shoe sole with an apron having the opposite side margins progressively increasing in thickness towards the root or juncture of the said apron with the sole, comprising in combination a vertically moveable support upon which the sole engages frictionally, a splitting knife, means comprising a roller moveable transversely above and relative to the said support and against which the sole is pressed during the sole splitting operation on raising the said vertically moveable support, abutments mounted in determined positions with reference to the said support, a projecting part upon the said roller for co-operating with the said abutments to deform a part of the sole both in the longitudinal and transverse directions, a reciprocatable carriage carrying the said knife and the said roller, a continuously rotating element, an intermittently rotatable element comprising a cam, a crank pin upon the said cam, means connecting the said crank pin with the said reciprocatable carriage, means for imparting motion from the said cam to the said vertically moveable support, means comprising pawl and ratchet mechanism for coupling the said continuously rotating element to the said intermittently rotatable element, and means for causing the said pawl to engage with the said ratchet wheel to effect the forward movement of the said reciprocatable carriage and for throwing the said pawl out of engagement with the said ratchet wheel and for holding the said intermittently rotatable element stationary on the completion of the return movement of the said reciprocatable carriage, substantially as described.

20. A method of forming a shoe sole for the reception of Louis heels which consists in deforming the heel portion of the sole in a longitudinal direction with the deformation increasing in a direction away from the heel end of the sole and splitting said sole from the heel end toward the heel breast line thereby to form an apron, the side margins of which are of progressively-increasing thickness toward the root or junction of the apron with the sole.

21. A method of forming a shoe sole for the reception of Louis heels which consists in deforming in a transverse direction the heel portion of the sole adjacent the heel breast line and then splitting said sole from the heel end to a point well within the deformed portion and with the line of split located entirely within the body of the sole from one side edge to the other thereby to produce an apron which decreases in thickness from its opposite side edges towards the longitudinal median line of the sole.

22. A method of forming a shoe sole for the reception of Louis heels which consists in deforming the heel portion of the sole adjacent the breast line in both a lateral and a longitudinal direction while leaving the rear end of the heel undeformed and then splitting said sole from the end of the heel portion towards the said heel breast line and to a point well within the deformed portion thereby to form an apron, the side margins of which are of progressively-increasing thickness towards the root or junction of the apron with the sole, and which apron decreases in thickness from its opposite side edges towards the longitudinal median line of the sole.

23. A method of forming a shoe sole with an apron for covering the breast face of a heel which consists in deforming the sole at and adjacent to the heel breast line in both a transverse and a longitudinal direction while leaving the extremity of the sole at the heel end undeformed and then splitting the sole from said undeformed extreme end into the deformed portion and to substantially the breast line of the heel.

24. A method of forming a shoe sole for the reception of Louis heels which consists in deforming the marginal portions of the sole at and adjacent the breast line of the heel while leaving the sole undeformed along the longitudinal median line and at the extremity of the heel and then splitting the sole from said heel extremity into the deformed portion substantially to the breast line of the heel.

CHARLES MARTIN BAGSHAW.